United States Patent [19]

Chin et al.

[11] Patent Number: 4,563,664

[45] Date of Patent: Jan. 7, 1986

[54] FORCE MOTOR WITH CONTOURED SPRING COUPLING

[75] Inventors: Philip C. Chin, Huntington Beach; Charles T. Lindsey, Irvine, both of Calif.

[73] Assignee: Parker-Hannifin Corporation, Cleveland, Ohio

[21] Appl. No.: 596,491

[22] Filed: Apr. 4, 1984

[51] Int. Cl.[4] ............................................. H01F 7/08
[52] U.S. Cl. ..................................... 335/274; 335/262
[58] Field of Search ............... 335/229, 230, 265, 268, 335/274, 258, 266

[56] References Cited

U.S. PATENT DOCUMENTS

| | | | |
|---|---|---|---|
| 3,207,961 | 9/1965 | Lohr | 335/274 X |
| 3,690,431 | 9/1972 | Howard | 335/274 X |
| 3,940,726 | 2/1976 | Gershnow | 335/274 |
| 3,994,382 | 11/1976 | McIntosh | 335/274 X |
| 4,463,332 | 7/1984 | Everett | 335/274 X |

OTHER PUBLICATIONS

Application and Use of Rare Earth Magnets, by M. F. Marx, SAE Aerospace Control and Guidance Systems Committee, Meeting No. 41, Palo Alto, CA.

Primary Examiner—George Harris
Attorney, Agent, or Firm—Frederick L. Tolhurst

[57] ABSTRACT

A direct drive valve wherein a force motor (10) controls the position of a valve slide (20) through a linkage (14). The force motor includes a spring assembly (62) having cantilevered springs (68 and 70) that include petals (72). The armature (48) of the force motor is guided by a plurality of balls (84) that contact both an internal tube assembly (47) and the armature.

3 Claims, 6 Drawing Figures

FORCE MOTOR WITH CONTOURED SPRING COUPLING

BACKGROUND OF THE INVENTION

1. Field of the Invention

The subject invention is directed to force motors as used in fluid power systems and, more particularly, force motors wherein electro-magnetic coils are used to bias the field strength of a permanent magnet.

2. Description of the Prior Art

Controls for hydraulic power systems have had a long history of development. Early control systems were primarily mechanical linkages. These systems were reliable, but tended to be heavy, bulky and somewhat limited in capabilities. Also, as mechanical control systems grew in size and complexity they became increasingly costly to manufacture and maintain.

As an alternative to mechanical systems, electrical control systems became increasingly popular, particularly in aviation and related fields. Electrical control systems generally could be made smaller, lighter and more versatile than mechanical systems. However, electrical control systems had other disadvantages. For example, the quiescent leakage of electro-hydraulic valves was relatively high. Consequently, such systems required more power, generated more heat, and were generally more costly. Applications requiring redundancy in the control system, such as aviation applications, merely compounded these factors with a multiplicity of components in complex redundancy management systems.

Accordingly, it was recognized in the prior art that a mechanism that directly controlled hydraulic valves would be more efficient in terms of quiescent leakage and thus have many advantages over hydraulic control systems known in the prior art. Moreover, such use of direct drive valves would increase reliability and decrease bulk and weight of the hydraulic system. In addition, it was also recognized that direct drive valves would significantly limit failure monitoring for the control system, resulting in a correlative improvement in redundancy management.

Early direct drive valves employed force motors in which a magnetic assembly comprised of electrical coils was used to control the position of an armature. Subsequently the electrical coils were replaced by a permanent magnet in combination with several smaller electrical coils that were used to bias the field of the permanent magnet. It was found that this provided a magnetic assembly that was lighter and had lower power requirements than prior magnetic assemblies having no permanent magnets.

Previously, direct drive valves were developed having much-improved quiescent leakage characteristics typically in the range of 10% to 1%. One example is shown in a paper entitled "Application and Use of Rare Earth Magnets," by M. F. Marx, prepared for SAE Aerospace Control and Guidance Systems Committee, meeting No. 41, Palo Alto, Calif. However, several disadvantages remained in force motors known to the prior art. For example, some force motors had no mechanism for isolating the electrical coils of the magnetic assembly from the fluid of the hydraulic system. This exposure to hydraulic fluid made the magnetic assembly subject to premature failure. Other persistant problems with force motors have included a requirement for relatively high threshold command signals to initiate movement of the armature from a stationary position, as well as hysteresis in the armature movement relative to control current. These problems adversely effected the performance characteristics of the force motor, particularly sensitivity and stability.

Accordingly, there was a need in the prior art for a force motor that was suitable for use in a direct drive valve and that would overcome the threshold, hysteresis and other disadvantages of force motors known in the prior art.

SUMMARY OF THE INVENTION

In accordance with the subject invention, a force motor includes a magnetic assembly with magnetic pole pieces provided on each end. An armature that is movably located between the pole pieces is controlled by an electrical current to the magnetic assembly. A cantilevered spring assembly is connected to the armature such that it opposes movement of the armature from a reference position. The connection of the spring assembly to the armature is by contact between a mechanical extension of the armature and a face of the spring assembly. The contact surface of the mechanical extension is contoured to provide line contact with the spring assembly.

Other details, objects and advantages of the subject invention will become apparent as the following description of a presently preferred embodiment thereof proceeds.

BRIEF DESCRIPTION OF THE DRAWINGS

The accompanying drawings show a presently preferred embodiment of the invention in which.

DESCRIPTION OF THE PREFERRED EMBODIMENT

Figure 1:
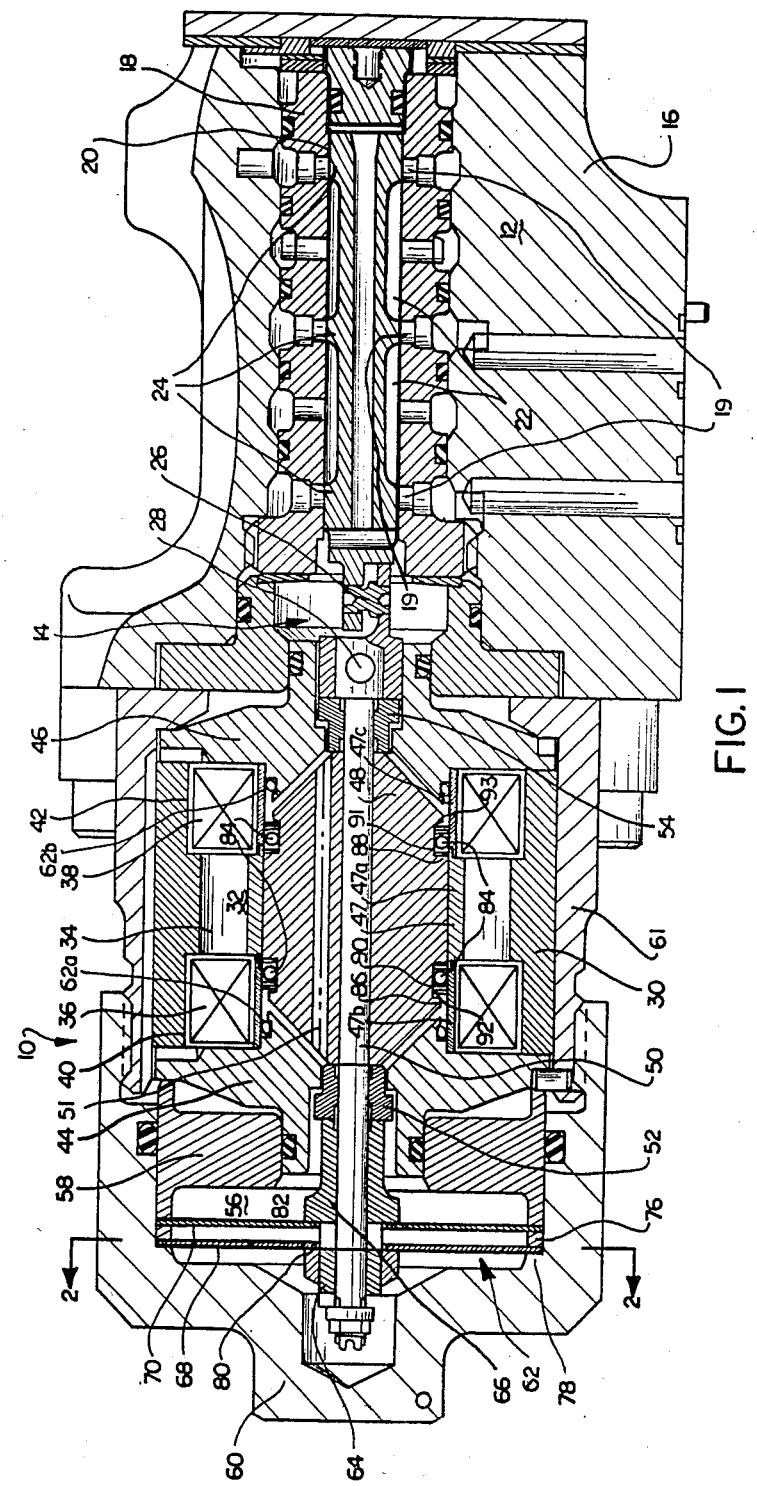
FIG. 1 is a cross-sectional view of a direct drive valve showing a force motor in accordance with the subject invention.

A preferred embodiment of the subject invention is shown in FIGS. 1-5 wherein a force motor 10 controls the position of a valve 12 through a direct linkage 14.

Valve 12 includes a manifold 16 that is provided with appropriate porting for connection to a hydraulic system. A valve sleeve 18 that includes metering orifices 19 is fitted within an internal bore of manifold 16. A valve slide 20 is slidably maintained in sleeve 18. Valve slide 20 is provided with a plurality of lands 24 and grooves 22 that, in conjunction with metering orifices 19, control the fluid flow to the sleeve ports in accordance with the position of valve slide 20.

Force motor 10 is connected to valve slide 20 through linkage 14. Linkage 14 includes a self-aligning joint 26. A magnetic pin 28 that is provided adjacent self-aligning joint 26 to collect metallic particles in the fluid.

Force motor 10 includes a casing 30 concentrically arranged about a magnetic assembly 32. Magnetic assembly 32 includes a permanent magnet 34 and electromagnetic coils 36 and 38. Coils 36 and 38 are circumferentially wound and contained in annular frames 40 and 42. The coils are electrically connected in series or in parallel with the number of coil turns being determined, in part, by the strength of permanent magnet 34.

Also included in force motor 10, pole pieces 44 and 46 are respectively located on opposite ends of casing 30 and magnetic assembly 32. A tube assembly 47 is sleeved within magnetic assembly 32 and between pole pieces 44 and 46. Tube assembly 47 includes a magnetic central band 47a that engages longitudinally aligned, non-magnetic outer bands 47b and 47c on opposite ends thereof. An armature 48 is located adjacent to magnetic assembly 32 within tube assembly 47 and between pole pieces 44 and 46. Armature 48 is movable between pole pieces 44 and 46.

A rod 50 extends longitudinally through armature 48 and is secured to the end faces of armature 48 by retainers 52 and 54. Rod 50 is connected at one end to self-aligning joint 26 of direct linkage 14. At the opposite end rod 50 extends from armature 48 into a chamber 56 that is defined by an annular spacer 58 in cooperation with a cover 60. Cover 60 engages one end of a housing 61 that supports casing 30 and pole pieces 44 and 46. A plurality of passageways 52 extend longitudinally through armature 48 such that chamber 56 is in fluid communication with valve 12 by a flow path through passageways 51 and around retainers 52 and 54 and direct linkage 14.

An o-ring 62a is provided between outer band 47b and pole piece 44 and an o-ring 62b is provided between outer band 47c and pole piece 46. O-rings 62a and 62b form a seal between tube assembly 47 and pole pieces 44 and 46 and cooperate with tube assembly 47 and pole pieces 44 and 46 to isolate magnetic assembly 32 from hydraulic fluid surrounding armature 48.

In chamber 56, rod 50 is connected to spacers 64 and 66 which cooperate with rod 50 to form a mechanical extension of armature 48 that mechanically couples the armature to a spring assembly 62. Spring assembly 62 includes cantilevered springs 68 and 70 which are maintained in spaced-apart, parallel relationship by an annular spacer 76. As particularly shown in FIG. 2, springs 68 and 70 are each provided with a plurality of triangularly shaped petals 72 that are circumjacently arranged along an inner edge 74. Spring assembly 62 is secured in cantilevered fashion against a shoulder 78 of cover 60 by compression between shoulder 78 and annular spacer 58. As specifically used herein, springs 68 and 70 are "cantilevered" in that they are secured adjacent the perimeter and flexed from a point adjacent inner edge 74.

Figures 3, 5, 6:
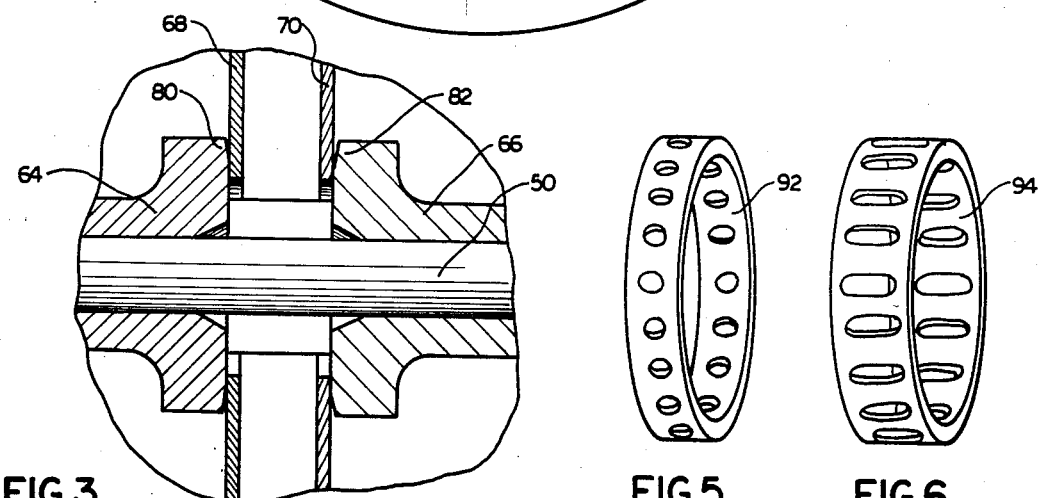
FIG. 3 is an enlarged partial cross-section of the direct drive valve of FIG. 1 showing a portion of the spring assembly.
FIG. 5 is a perspective view of the retainer of the ball and retainer assembly shown in FIGS. 1 and 4.
FIG. 6 shows a perspective view of an alternative embodiment of the retainer shown in FIG. 5.

As best shown in FIG. 3, the faces of spacers 64 and 66 adjacent the opposing faces of springs 68 and 70 respectively are provided with annular extensions such as annular flanges 80 and 82. Annular flanges 80 and 82 contact the respective opposing face of springs 68 and 70 at a location adjacent edge 74. The contact surfaces of annular flanges 80 and 82 are contoured such that contact between the annular flanges 80 and 82 and springs 68 and 70 is substantially line contact. In FIG. 3, the cross-sectional view of the contact surfaces of flanges 80 and 82 shows that they are respectively radi-used such that the contact between flanges 80 and 82 are springs 68 and 70 is substantially circular, line contact. More specifically, in the preferred embodiment, the contact surfaces of flange 80 and 82 are located at a continuous radius.

Figure 4:
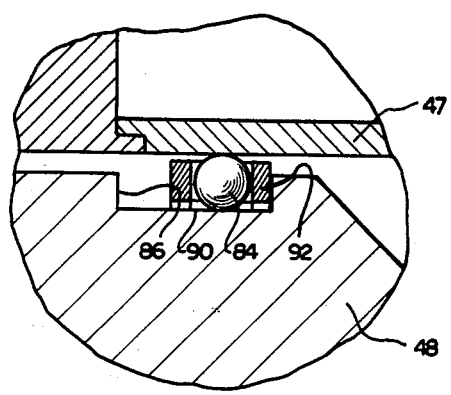
FIG. 4 is an enlarged partial cross-section of the direct drive valve of FIG. 1 showing the balls and retainers that support the armature in the tube assembly.

As particularly shown in FIGS. 4 and 5, a plurality of balls 84 supports armature 48 concentrically within magnet assembly 32 and tube assembly 47 in a longitudinally movable manner. In the preferred embodiment, armature 48 is provided with annular grooves 86 and 88 having base surfaces 90 and 91. Balls 84 contact base surfaces 90 and 91 and tube assembly 47 to maintain armature 48 in a fixed radial position within tube assembly 47 such that it is substantially aligned with the longitudinal central axis of magnetic assembly 32.

Balls 84 are circumferentially maintained in regularly spaced relationship in annular grooves 86 and 88 by retainers 92 and 93 respectively. Retainers 92 and 93 are provided with a plurality of regularly spaced holes each corresponding to a respective ball. The radial thickness of retainers 92 and 93 is such that balls 84 located in the respective holes of the retainer protrude radially through the sides thereof and contact tube assembly 47 and base surfaces 90 and 91 of armature 48. The width of retainers 92 and 93 is narrower than the width of grooves 86 and 88. Further, the width of retainers 92 and 93 is sized with respect to the stroke of armature 48 such that, as armature 48 moves between pole pieces 44 and 46, retainers 92 and 93 move freely between the sidewalls of annular grooves 86 and 88.

FIG. 6 shows an alternative embodiment of a retainer for balls 84. In this embodiment, a retainer 94 is provided with elongated holes corresponding to respective balls 84. In contrast to retainer 92 in FIG. 5, retainer 94 is secured to armature 48 and does not move freely with respect thereto. Instead, the major axes of the elongated holes are generally aligned with the longitudinal movement of armature 48 and, as armature 48 moves between pole pieces 44 and 46, balls 84 traverse the elongated holes. The width of retainer 94 and the dimension of the elongated holes along their major axis is sized with respect to the stroke of armature 48. Thus, as armature 48 moves between pole pieces 44 and 46, balls 84 move freely along the elongated holes.

In the operation of the preferred embodiment, armature 48 is connected through direct linkage 14 to valve slide 20. Thus, the movement of armature 48 results in a corresponding movement of valve slide 20 to determine the flow of fluid through valve 12. Force motor 10 controls the position of armature 48 by balancing the magnetic force exerted on armature 48 by magnetic assembly 32 against the opposing spring force of spring assembly 62.

Magnetic assembly 32 provides a magnetic field having a permanent field component and a variable field component. Non-magnetic outer bands 47b and 47c of tube assembly 47 cooperate with central band 47a to channel the magnetic field through the end of armature 48 and pole pieces 44 and 46. The permanent field component of magnetic assembly 32 is developed by permanent magnet 34 and the variable field component is developed by coils 36 and 38. Thus, the electric current to coils 36 and 38 is controlled to bias the field of magnetic assembly 32.

The spring force of spring assembly 62 is greater than the magnetic forces between armature 48 and pole pieces 44 and 46 resulting from the permanent field component of permanent magnet 34 alone. Thus, with no input to coils 36 and 38 of magnet assembly 32, spring assembly 62 maintains armature 48 at a reference position as shown in FIG. 1. However, when input current is supplied to coils 36 and 38, the magnetic field of magnetic assembly 32 is biased such that the force between armature 48 and pole pieces 44 and 46 exceeds the force of spring assembly 62 at the reference position. Armature 48 then moves toward pole piece 44 or 46 in accordance with the magnetic field bias as determined by the magnitude and direction of current in coils 36 and 38.

As armature 48 moves from the reference position, the spring force of spring assembly 62 increases substantially in proportion to the mechanical displacement of springs 68 and 70 until an equilibrium position is established at which the magnetic forces between armature 48 and pole pieces 44 and 46 are balanced by the spring force. Thus, the position of armature 48 is determined by the input current to magnetic assembly 32.

Figure 2:
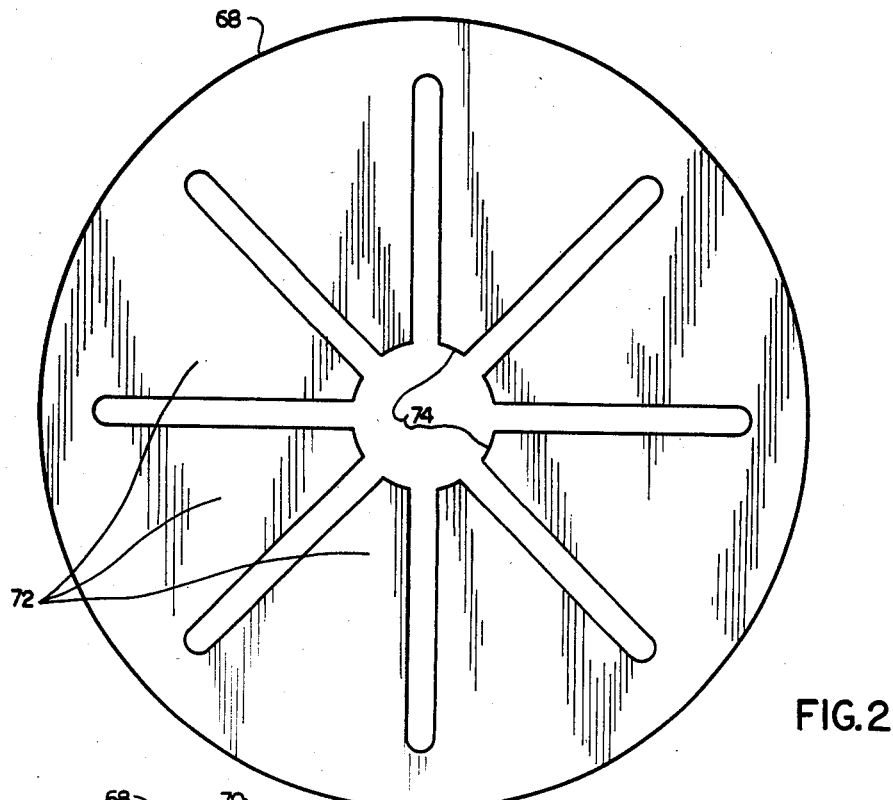
FIG. 2 is a cross section of the direct drive valve of FIG. 1 taken along the lines 2—2 and showing a cantilevered spring.

As specifically shown in FIG. 2, to provide redundancy in spring assembly 62, cantilevered springs 68 and 70 each include a plurality of triangularly shaped petals 72. Petals 72 are of an angular size such that the loss of a specified number of petals does not substantially effect the spring force of spring assembly 62 with respect to displacement of springs 68 and 70.

To limit the required thickness of springs 68 and 70 and to increase sensitivity of spring assembly 62 in view of the petal structure of springs 68 and 70, two springs are used in complementary arrangement. In response to movement of armature 48, springs 68 and 70 are loaded in only one direction against their respective spacers 64 and 66. Specifically, as armature 48 moves from the reference position in a direction away from valve 12, spring 70 operates against spacer 66 to oppose this movement and spring 68 moves out of contact with spacer 64. Conversely, as armature 48 moves from the reference position in a direction toward valve 12, spring 70 moves away from spacer 66, but spring 68 operates against spacer 64 to oppose the armature movement.

The use of two springs 68 and 70 in complementary fashion permits the springs to be preloaded against spacers 64 and 66 such that the reference position of armature 48 can be precisely established by adjustment of the location of spacers 64 and 66 on rod 50. Thus the mechanical extension between armature 48 and spring assembly 62 provides for adjustment to compensate for variations within tolerances, in spring assembly 62 and elsewhere in force motor 10.

The force motor of the subject invention has low threshold friction and low mechanical hysteresis. Fluid at the end of armature 48 that is adjacent linkage 14 communicates through passageways 51 to the opposite end of armature 48, chamber 56, and spring assembly 62. Thus, no dynamic seals are required between armature 48 and tube assembly 47, eliminating the frictional effects of any dynamic fluid seal on the armature.

As specifically shown in the cross-sectional view of FIG. 3, to further limit threshold friction in the force motor, flanges 80 and 82 of spacers 64 and 66 are contoured on a continuous radius. The contour of flanges 80 and 82 permits springs 68 and 70 to roll on the surface of flanges 80 and 82 forming substantially line contact therewith. This limits high friction forces due to sliding movement between spacers 64 and 66 and springs 68 and 70 upon movement of armature 48 and results in more linear, even movement of armature 48. Contoured spacers 64 and 66 having a non-continuous radius cross-section would further limit sliding between spacers 64 and 66 and springs 68 and 70. However, due to the expense and difficulty of manufacturing flanges having such a non-continuous radius, the continuous radius is disclosed in the presently preferred embodiment.

Balls 84 are circumferentially maintained in retainers 92 and 93 as shown in FIGS. 1 and 4 or, alternatively, in retainer 94 as shown in FIG. 6. Thus, balls 84 maintain armature 48 concentrically within tubular assembly 47 and concentrically within magnetic assembly 32. Balls 84, which contact both tubular assembly 47 and armature 48, operate as free-rolling guides for the armature. Thus balls 84 also operate in a manner that limits frictional effects on armature 48 and produces more linear movement and greater sensitivity of force motor 10 in response to input current.

While a presently preferred embodiment of the subject invention has been shown and described, the invention is not limited thereto, but may be otherwise variously embodied within the scope of the following claims.

We claim:

1. A force motor comprising:
   a casing;
   first and second pole pieces arranged on opposite ends of said casing;
   a magnetic assembly located within said casing and between said pole pieces, said magnetic assembly including a permanent magnet and one or more electrical coils;
   an armature that includes a mechanical extension and that is movable between said pole pieces in response to an input signal to said magnetic assembly; and
   a spring assembly having two, complementary arranged, cantilevered springs that are mechanically coupled to said armature by the mechanical extension, each of said springs having an inner edge and the mechanical extension of said armature having a contoured surface to provide substantial line contact between said mechanical extension and one face of said cantilevered springs at a radius adjacent the inner edge of said cantilevered springs, said spring assembly opposing movement of said armature from a reference position, the opposing force of said spring assembly when said armature is out of said reference position being greater than the force of the permanent magnet of the magnetic assembly with no input current to the coils.

2. The force motor of claim 1 wherein said mechanical extension includes a spacer having an annular flange that provides said contoured surface.

3. The force motor of claim 1 or 2 wherein the contoured surface of said annular flange has a constant radius of curvature.

* * * * *